Patented Apr. 5, 1932

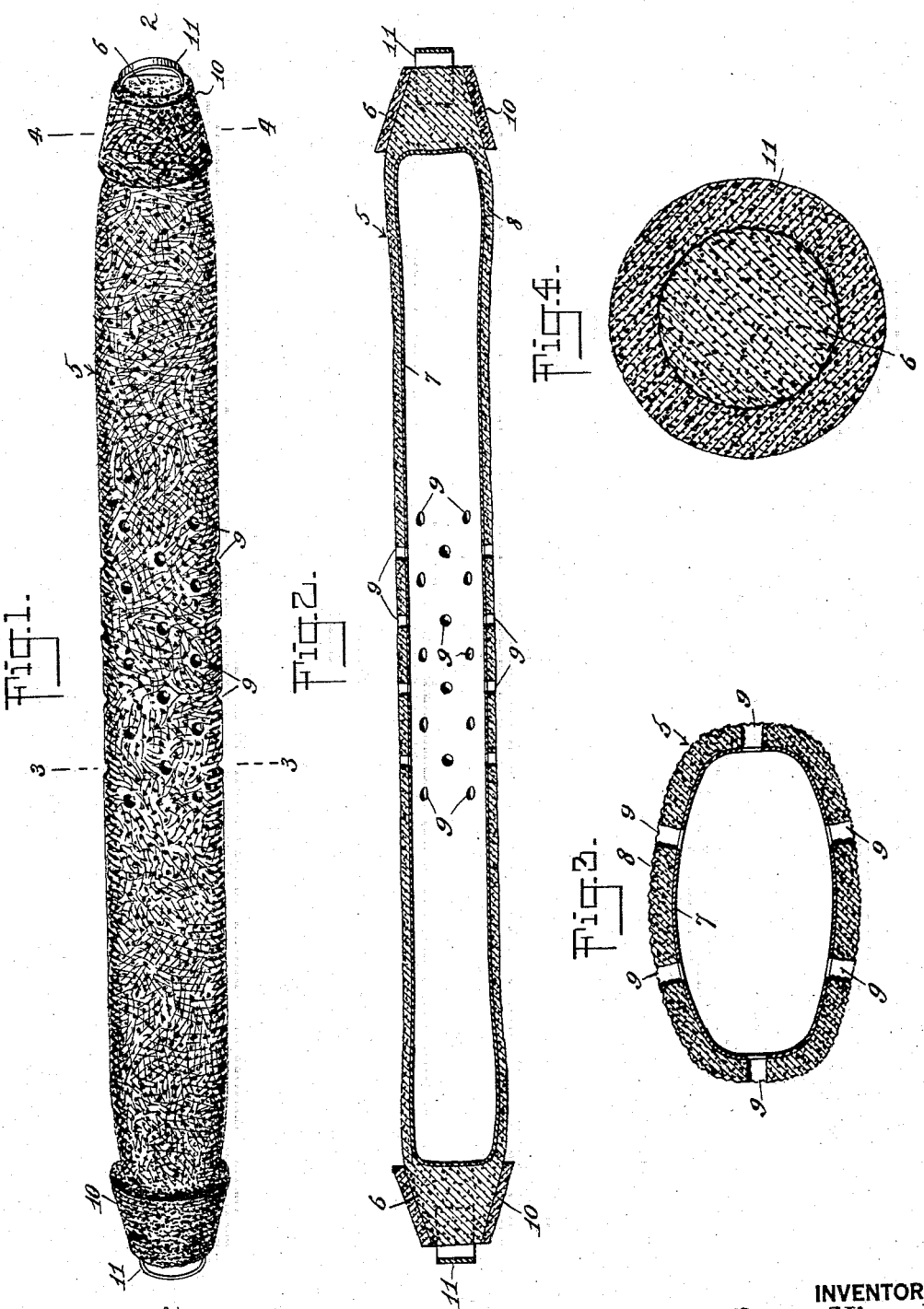

1,852,991

UNITED STATES PATENT OFFICE

GEORGE VIRNEBURG, OF NEW YORK, N. Y.

CLEANING AND MASSAGING DEVICE

Application filed July 26, 1930. Serial No. 470,978.

The invention relates to a cleaning and massaging device and it has for an object to provide such a device which may be used to clean the body and particularly the back, and also as a massage device. The device is hollow and under ordinary conditions it will be filled with water, either hot or cold, or, if desired, with soapy water, but it will be understood that it may also be filled with other fluids or materials for medical use.

The invention has for another object to provide an elongated hollow member for supporting a fluid and having outlets at predetermined positions so that when the member is used the fluid will slowly pass from within the member to its outer surface.

Still another object of the invention is to construct the hollow member of rubber with its outer surface sponge rubber, which is useful for massaging purposes.

A further object of the invention is to provide openings at the central portions of the hollow member, these openings not only permitting the fluid contained within the member to reach its outer surface when the member is used, but also making it possible to hang the member up at its ends, permitting the contents to drain through the said openings.

Additional objects of the invention will appear in the following specification in which the preferred form of the invention is described.

In the drawings similar reference characters refer to similar parts in all the views, of which Figure 1 is a side elevation showing the invention, Figure 2 is a sectional view on the line 2—2 of Figure 1, Figure 3 is an enlarged sectional view on the line 3—3 of Figure 1, and Figure 4 is an enlarged sectional view on the line 4—4 of Figure 1.

By referring to the drawings it will be seen that the member 5 is elongated and has closed ends 6, the elongated member being hollow from one end to the other end. The hollow elongated member 5 is constructed of rubber and has an inner lining 7 which is impervious to fluids, the outer portion 8 of the elongated member and also preferably the ends 6 being constructed of rubber having the characteristics of sponge rubber.

This elongated member 5 is preferably oval in shape in cross section, as illustrated in Figure 3 of the drawings and it has at its central portions openings 9 which extend through the outer sponge rubber and through the lining 7 so that fluids may pass into and out of the hollow portion of the member. Preferably there are caps 10 at the ends of the elongated member 5 for reinforcing purposes, and secured to the caps 10, or if desired, to the ends 6, there are loops 11 which may be gripped by the user, these loops 11 also serving to permit the elongated member 5 to be hung up at its ends, so that any fluid which may be contained in the hollow member will be drained through the openings 9.

It will be understood that the elongated member 5 may be used with hot, cold or soapy water, or if desired, with a medicinal preparation and that when the elongated hollow member is filled with a suitable fluid it may be rubbed against the surface of the body, the fluid contained in the hollow member slowly passing to the outer surfaces thereof for action against the skin of the user. It will be understood that the openings 9 in the upper portion of the member 5 will permit the air to escape as the fluid enters the openings 9 at the lower portion of the member. In ordinary use the hollow member 5 is filled with soapy water by dipping the hollow member 5 in this fluid and it is then gripped by the loops or ends and is stretched as it is rubbed across the skin. This will serve not only to wash the skin, but it will at the same time massage the skin. Subsequently the soapy water may be drained from the hollow member 5, when the hollow member may be filled with clean water and stretched as it is rubbed against the surface of the body, which will not only massage the skin, but will remove any soap which may be on the skin because of its former treatment with the soapy fluid.

It will be understood that the device may not only be used for washing purposes, as has been stated, but the device may be used for massaging the body with another fluid contained in the hollow member, or if desired the hollow member may be wholly or partially filled with a medicinal preparation which will flow through the openings in the hollow member when it is rubbed across the skin of the body, and the body massaged in the manner described.

What is claimed is:

1. In a cleaning and massaging device, a tubular rubber member having an impervious rubber inner lining and sponge rubber at its outer side, there being apertures through and spaced apart around the member which permit the entrance of a fluid into the tubular member for substantially filling the tubular member from end to end with the fluid, the apertures permitting the feeding of the fluid to the outer surface of the member during use, the tubular member having heads at its ends which are thicker than the body of the tubular rubber member and which serve to hold the walls of the tubular rubber member spaced apart when the ends of the tubular rubber member are moved away from each other.

2. In a cleaning and massaging device, a tubular rubber member with an impervious inner lining and with thickened rubber heads at its ends, the opening in the tubular rubber member extending to the heads and the heads serving to hold the walls of the tubular rubber member yieldingly spaced apart when the tubular rubber member is stretched by drawing the heads away from each other, the tubular rubber member having sponge rubber at its outer side, there being apertures through and spaced apart around the member which permit the entrance of a fluid into the tubular member for substantially filling the tubular from head to head, the apertures permitting of the feeding of the fluid to the outer surface of the tubular rubber member during use, and loops secured to the heads of the tubular rubber member.

Signed at New York, in the county of New York and State of New York this 25th day of July, 1930, A. D.

GEORGE VIRNEBURG.